United States Patent [19]

Drotar et al.

[11] Patent Number: 4,509,772
[45] Date of Patent: Apr. 9, 1985

[54] ONE-PIECE ADJUSTING SLEEVE

[75] Inventors: Frederick L. Drotar, Newport; David R. Wotton, Ann Arbor; Carroll D. Dickerson, New Hudson; Lawrence A. Makowski, Livonia, all of Mich.

[73] Assignee: Ford Motor Company, Dearborn, Mich.

[21] Appl. No.: 28,627

[22] Filed: Apr. 9, 1979

[51] Int. Cl.³ .............................................. B62D 17/00
[52] U.S. Cl. .................................................... 280/661
[58] Field of Search .................... 280/661, 95 R, 668, 280/96.1, 96.2, 674

[56] References Cited

U.S. PATENT DOCUMENTS

| | | | |
|---|---|---|---|
| 2,405,458 | 8/1946 | Slack et al. | 280/661 |
| 2,544,331 | 3/1951 | Kogstrom | 280/96.2 |
| 2,900,196 | 8/1959 | Nienke | 280/96.1 |
| 3,034,810 | 5/1962 | Primeau | 280/674 |
| 3,563,564 | 2/1971 | Bartkowiak | 280/96.1 |
| 3,880,444 | 4/1975 | Bridges | 280/96.2 |
| 3,887,211 | 6/1975 | Mazur | 280/95 R |
| 4,026,578 | 5/1977 | Mattson | 280/661 |
| 4,232,880 | 11/1980 | Dickerson et al. | 280/661 |
| 4,252,338 | 2/1981 | Ingalls et al. | 280/661 |

Primary Examiner—Robert R. Song
Attorney, Agent, or Firm—Jerome R. Drouillard; Roger L. May

[57] ABSTRACT

A one-piece sleeve fitted within an aperture of a top arm of a spindle. The sleeve has an aperture therethrough angled with respect to the central axis of the sleeve. The angled aperture is constructed to receive a tapered ball stud integral with a ball mounted within a control arm. The ball stud extends through the aperture with the fastener threaded thereon to abut the sleeve and to draw into the tapered aperture a tapered section of the stud to expand the sleeve and frictionally lock the sleeve within its mounting aperture in the top arm of the spindle and the stud within the angled aperture. The sleeve when unlocked, can be rotated to adjust the camber, or pneumatic trail of the wheel assembly.

9 Claims, 5 Drawing Figures

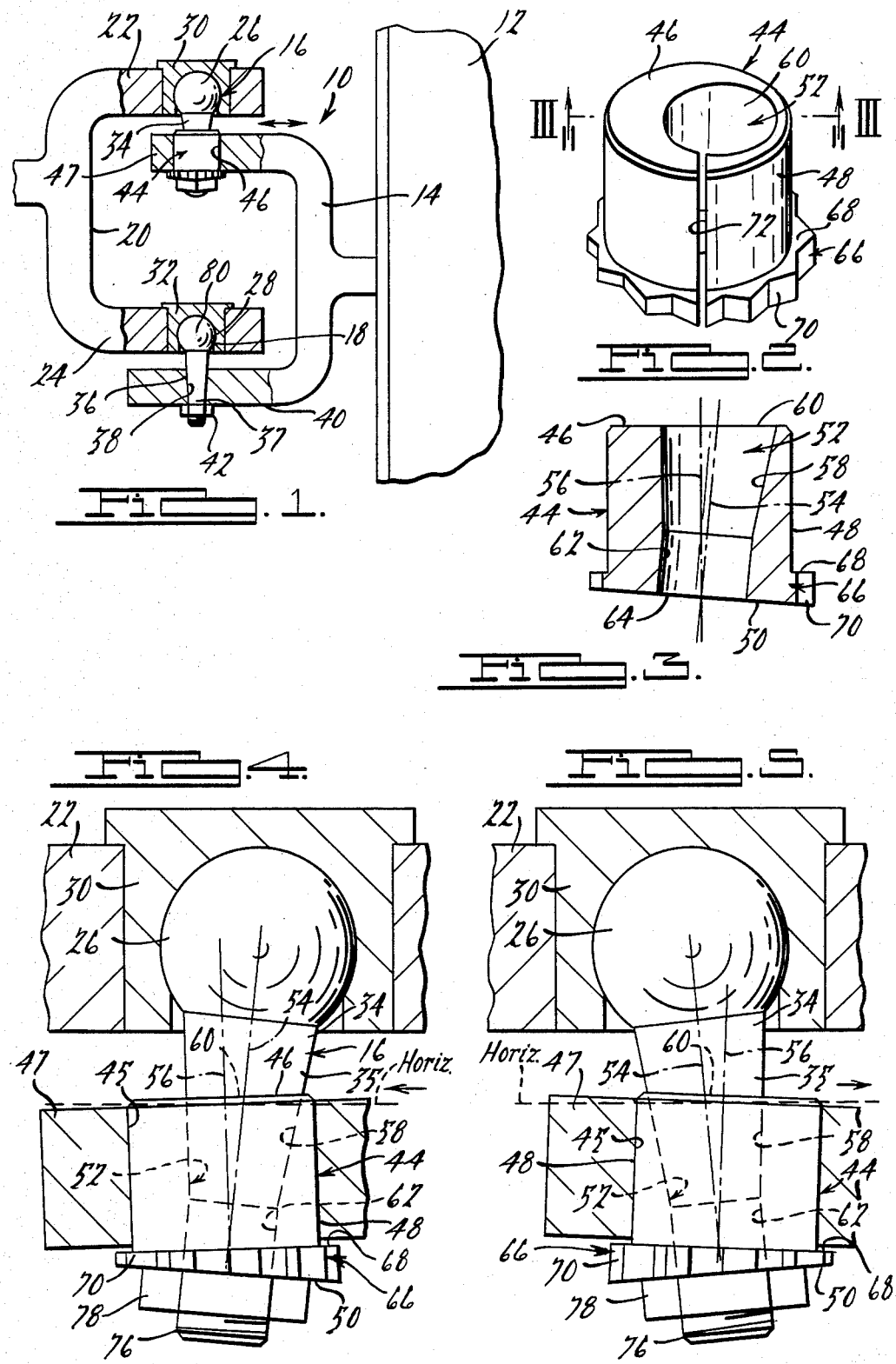

ONE-PIECE ADJUSTING SLEEVE

BACKGROUND OF THE INVENTION

1. Field of the Invention

This invention relates to a one-piece adjusting sleeve and more particularly for an adjusting sleeve to adjust the camber and castor or pneumatic trail of a steerable wheel assembly.

2. Description of the Prior Art

Sleeves with an eccentrically displaced hole therethrough are used to adjust the camber and/or caster of a steerable wheel assembly. The sleeve has an outer surface rotatable with respect to its central axis and an eccentrically displaced aperture therethrough with its axis parallel to the central axis of the outer surface. A ball stud is inserted within the eccentric hole. Rotation of the sleeve adjusts the member which mounts the sleeve with respect to a member which mounts the ball joint which has the integral stud thereon. One such eccentric sleeve is disclosed in U.S. Pat. No. 4,026,578 issued to Mattson on May 31, 1977. The sleeve in the Mattson patent is used in a MacPherson strut assembly. Similar sleeves have also been known to be used in a steerable wheel assembly using a spindle with an upper and lower arm mounted by a ball joint to lower and upper control arms.

These eccentric holes within sleeves adequately adjust the camber and/or caster of a wheel assembly within a certain range. However, the range is limited due to the sleeves maximum diameter which in turn is limited due to the width of the spindle control arm to which it is mounted. In addition, the range of adjustment is limited due to the structure of the sleeve and its relation to the spindle and ball stud. In wheel assemblies that incorporate lower and upper control arms and a spindle mounted thereto through the use of ball joints, camber and castor adjustment changes the angle of the spindle due to rotation of the spindle about the center of the ball joint. Due to this angling, the ball stud which is adjustable must point in a direction away from the motion of the spindle which causes the spindle to move partially back from the desired direction of adjustment in order for the hole and ball stud to correctly fit together. The retrograde motion of the stud unduly limits the range of adjustment of a given diameter sleeve.

SUMMARY OF THE DISCLOSURE

According to the invention, a one-piece sleeve with a predetermined diameter is constructed to increase the range of camber and castor or pneumatic trail adjustment of a wheel assembly. The wheel assembly is mounted onto a spindle. The spindle has vertically spaced upper and lower arms. The spindle arms are rotatably mounted respectively to an upper and lower control arm. The one-piece sleeve is mounted in one of the upper or lower arms. A ball joint is mounted to the other of the respective upper or lower arms. The sleeve has an angled hole therethrough which receives a ball stud integral with a ball of said ball joint such that the ball stud points in the same direction as the spindle arm adjustment to increase the range of adjustment of the spindle given the diameter of the said sleeve.

In one embodiment, the sleeve has an outer cylindrical surface with the angled aperture tapered from the top flat end of the sleeve to the bottom end of the sleeve.

In one embodiment, the bottom end is inclined to be perpendicular to the axis of the aperture through the sleeve. The inclined end allows the nut or fastener which threads onto an integral threaded portion of the ball stud to sit flush against the sleeve.

In one embodiment, the sleeve has a slot axially extending therethrough which accommodates manufacturing tolerances and facilitates expansion of the sleeve when the ball stud is pressed within the aperture to expand the outer surface and frictionally lock the outer surface against the surface of a cylindrical aperture through the arm to which said sleeve is mounted.

BRIEF DESCRIPTION OF THE DRAWINGS

Reference now will be made to the following drawings in which:

FIG. 1 is a side elevational and partially segmented view showing one embodiment of the invention in a preferred setting.

FIG. 2 is a perspective view of the embodiment shown in FIG. 1.

FIG. 3 is a cross-sectional view taken along the lines III—III in FIG. 2.

FIG. 4 is a side elevational enlarged and segmented view showing the disclosed embodiment adjusting the spindle to a negative camber.

FIG. 5 is a view similar to FIG. 4 showing the sleeve adjusting the spindle to a positive camber.

DETAILED DESCRIPTION OF THE PRESENTLY PREFERRED EMBODIMENT

Referring now to FIG. 1, a wheel assembly 10 has a wheel 12 mounted to a spindle 14 which is mounted through ball joints 16 and 18 to an axle 20. The axle 20 has an upper control arm 22 and a lower control arm 24. The upper and lower control arms 22 and 24 can be integrally formed with the axle 20. The control arms 22 and 24 can also be pivotably connected about horizontal axis to the axle 20 or other frame member (not shown).

Each ball joint 16 and 18 has a ball 26 and 28 mounted within sockets 30 and 32 respectively. Each ball 26 and 28 has an integrally formed stud portion 34 and 36 respectively. Stud 36 extends through a tapered aperture 38 in a lower arm 40 of spindle 14. Fastener 42 threadably fastens onto threaded cylindrical end 37 of stud 36 to fix stud 36 with respect to lower arm 40.

Upper stud 34 extends through a sleeve 44 which is mounted within an aperture 45 in upper arm 47 of spindle 14. As more clearly shown in FIGS. 2 and 3, the sleeve 44 has a planar upper end 46, a cylindrical outer surface 48 and an inclined bottom surface 50.

Aperture 52 extends from the planar upper end 46 through the bottom surface 50 with its central axis 54 angled with respect to the central axis 56 of outer surface 48. The aperture 52 has a tapered section 58 from its top opneing 60 in end 46 to a cylindrical section 62 which extends to opening 64 in surface 50. Axis 54 intersects axis 56 in the plane of the bottom surface 50. Even greater adjustment capabilities can be accomplished at the expense of greater machining costs if axis 56 intersect axis 54 between bottom surface 50 and upper end 46. Flange 66 radially extends outwardly from the cylindrical surface 48 near bottom surface 50. The flange 66 forms a shoulder 68 which has its plane substantially perpendicular to the cylindrical outer surface 48. In addition, the flange has a serpentine outer wall 70 which provides for an easily grasped rotatable sleeve.

An axially extending slot 72 extends from the upper end 46 through the cylindrical portion and through the flange 66 to bottom surface 50. The slot 72 extends from the outer surface 48 to the aperture 52.

Referring now to FIGS. 4 and 5, the sleeve 44 is mounted within an aperture 45 through the upper arm 47 such that a slight gap exists between shoulder 68 and the lower surface 73 of spindle arm 47. Ball stud 34 has its tapered section 35 abut the tapered section 58 of aperture 52 and its threaded cylindrical section 76 extends through the cylindrical portion 62 of aperture 52 beyond bottom surface 50. Fastener 78 is threaded onto section 76 and tightened to abut end 50 in a flush manner such that tapered section 58 receives said tapered section 35 of ball stud 34. Sleeve 44 can slide up or down within aperture 45 to accommodate for varying distances the sleeve is from the ball joint 16. Tightening of nut 78 expands the sleeve to force the outer surface 48 to frictionally lock with respect to spindle arm 47 in aperture 46.

When the spindle arm 47 is positioned inwardly (to the left as viewed in FIG. 4) to provide a negative camber, the spindle arm 47 undergoes a slight inclination with respect to the horizontal due to the fact of rotation about a ball center 80 of the lower ball as shown in FIG. 1. The ball stud 34 is also angled in the direction of the displacement of the upper arm 47 with sleeve 44 rotated to have opening 60 eccentrically displaced outwardly with respect to the central axis 56 of sleeve 44.

Referring now to FIG. 5, when the spindle is adjusted to have positive camber, sleeve 44 is rotated 180° to have axis 54 of aperture 52 inwardly displaced from axis 56 at opening 60. The spindle arm 47 is slightly inclined at an opposing angle from FIG. 4. In addition, aperture 45 is moved toward the right. Ball stud 34 is angled outwardly.

When the sleeve is rotated to a desired position, the fastener 78 is fastened onto the cylindrical threaded portion 76 to abut surface 50 and draw in tapered section 35 into the tapered section 58 of aperture 52 to expand sleeve 44 and frictionally lock the outer surface 48 with respect to aperture 45.

If adjustment of pneumatic trail of the wheel is desired, the sleeve can be rotated 90° from the positions illustrated in FIGS. 4 and 5. The 90° rotation provides for the ball stud extending longitudinally forward or rearward with respect to the wheel assembly.

The sleeve can be rotated to other positions than the two positions which adjusts only camber or the two positions which adjust only pneumatic trail, to provide for a wheel position with a combination of pneumatic trail adjustments and camber adjustments.

The one-piece sleeve can also adjust castor if it is mounted on the control arm and the ball joint is mounted on the spindle arm. The sleeve operates in the same fashion to adjust camber but the intermediate positions of the rotatable sleeve will affect the castor rather than the pneumatic trail of the wheel assembly.

In this fashion, a rotatable sleeve with an angled hole therethrough is provided which allows for adjustment of a spindle in which the ball stud is angled to maximize the camber, castor, or pneumatic adjustments of the wheel assembly.

Variations and modifications of the invention can be made without departing from the scope and spirit which are defined in the appended claims.

The embodiments of the invention in which an exclusive property or privilege is claimed are defined as follows:

1. A one-piece adjustable sleeve for a steerable wheel assembly including an axle with lower and upper vertically spaced control arms connected to a supportive vehicle member, a spindle mounting a wheel assembly, said spindle having lower and upper arms pivotably connected to said control arms, ball joints connecting said control arms to said arms of said spindle; said sleeve comprising;
   an outer surface centered about a central axis;
   mounting means for mounting said sleeve into an aperture in one of the upper or lower arms for rotation about said central axis of said sleeve,
   an aperture extending through said sleeve with the axis of said aperture angled with respect to said central axis of said sleeve;
   said aperture sized to snugly receive an integral stud of one ball of one of said ball joints mounted to the other of said upper or lower arms;
   said sleeve, ball joint, and stud being constructed to allow said stud to incline and extend through said angled aperture at any rotatably adjusted position of said sleeve; and
   locking means for fixedly locking said stud within said sleeve and said sleeve within said aperture within said arm for securing said spindle in a desired position with respect to said control arms to mount said wheel assembly with a desired camber and castor or pneumatic trail.

2. A one-piece adjustable sleeve for a steerable wheel assembly including an axle with lower and upper vertically spaced control arms connected to a supportive vehicle member, a spindle mounting a wheel assembly, said spindle having lower and upper arms pivotably connected to said control arms, ball joints connecting said control arms to said arms of said spindle; said sleeve comprising;
   an outer surface centered about a central axis;
   mounting means for mounting said sleeve into an aperture in one of the upper or lower arms for rotation about said central axis of said sleeve;
   an aperture extending through said sleeve with the axis of said aperture angled with respect to said central axis of said sleeve;
   said aperture sized to snugly receive an integral stud of one ball of one of said ball joints mounted to the other of said upper or lower arms;
   said sleeve, ball joint, and stud being constructed to allow said stud to incline and extend through said angled aperture at any rotatably adjusted position of said sleeve;
   locking means for fixedly locking said stud within said sleeve and said sleeve within said aperture within said arm for securing said spindle in a desired position with respect to said control arms to mount said wheel assembly with a desired camber and castor or pneumatic trail;
   said ball stud being tapered from said ball joint;
   said aperture through said sleeve being tapered away from said ball to receive said stud;
   said outer surface being substantially cylindrical in shape;
   said sleeve being fitted within an aperture through one arm of said spindle;
   an axial extending slot extending from the top to the bottom of said sleeve and from said aperture through the sleeve to said outer surface for allowing said sleeve to radially expand when said tapered stud is pressed therein to press fit and frictionally lock said outer surface against sides of the aperture through said mounting arm and said stud against sides of said aperture through said sleeve to rigidly secure said stud to said spindle arm.

3. A one-piece adjustable sleeve for a steerable wheel assembly including an axle with lower and upper vertically spaced control arms connected to a supportive vehicle member, a spindle mounting a wheel assembly, said spindle having lower and upper arms pivotably connected to said control arms, ball joints connecting said control arms to said arms of said spindle; said sleeve comprising:

- an outer surface centered about a central axis;
- mounting means for mounting said sleeve into an aperture in one of the upper or lower arms for rotation about said central axis of said sleeve;
- an aperture extending through said sleeve with the axis of said aperture angled with respect to said central axis of said sleeve;
- said aperture sized to snugly receive an integral stud of one ball of one of said ball joints mounted to the other of said upper or lower arms;
- said sleeve, ball joint, and stud being constructed to allow said stud to incline and extend through said angled aperture at any rotatably adjusted position of said sleeve;
- locking means for fixedly locking said stud within said sleeve and said sleeve within said aperture within said arm for securing said spindle in a desired position with respect to said control arms to mount said wheel assembly with a desired camber and castor or pneumatic trail;
- said ball stud being tapered from said ball joint;
- said aperture through said sleeve being tapered away from said ball to receive said stud;
- said outer surface being substantially cylindrical in shape;
- said sleeve being fitted within an aperture through one arm of said spindle;
- an axial extending slot extending from the top to the bottom of said sleeve and from said aperture through the sleeve to said outer surface for allowing said sleeve to radially expand when said tapered stud is pressed therein to press fit and frictionally lock said outer surface against sides of the aperture through said mounting arm and said stud against sides of said aperture through said sleeve to rigidly secure said stud to said spindle arm:
- a flange at the end of the sleeve extending radially outward from said outer cylindrical surface forming a shoulder which is vertically spaced from said mounting arm;
- said end inclined with respect to said central axis of said cylindrical surface and substantially perpendicular to the axis of said tapered aperture for allowing a threaded fastener to threadably engage an extending end of said stud portion and flushly sit against said end.

4. A sleeve as defined in claim 3 wherein
said flange has a serpentine outer wall to facilitate grasping and rotating thereof.

5. A sleeve as defined in claim 3 wherein;
said aperture has its axis intersect with said central axis of said cylindrical outer surface in the plane of said inclined end.

6. In a steerable structure for vehicles in which a steering member, adapted to support a spindle and a journaled wheel is rotatably carried by a support member through at least one ball joint having a movable shaft portion, the improvement comprising at least one bushing having a substantially cylindrical outer surface and an axis thereof, and an inner bore symmetrically defined in the bushing around an inner bore axis, the cylindrical axis and the inner bore axis being skewed relative to one another, the bushing being positioned in the support member with the inner bore of the bushing receiving the shaft portion of a ball joint mounted to the steering member, whereby the caster and camber of the steerable structure may be adjusted by means of the bushing by changing the relative position of the steering member and adjacent portion of the support member by means of such bushing.

7. An improvement as set forth in claim 6 in which the inner bore is tapered to receive a tapered shaft of a ball joint.

8. A bushing adapted to correct the alignment of a steerable structure for vehicles in which a steering member is rotatably carried by a support member through at least one ball joint, the bushing comprising a cylindrical member having a central axis, and an inner bore defined in the cylindrical member and having an inner bore axis, the inner bore axis and the cylindrical axis being skewed relative to one another.

9. A bushing as set forth in claim 8 in which the inner bore is tapered symmetrically at the inner bore axis.

* * * * *